United States Patent [19]

Matsuzaka

[11] 4,380,516
[45] Apr. 19, 1983

[54] CARBURETOR

[75] Inventor: Hiroshi Matsuzaka, Hamamatsu

[73] Assignee: Yamaha Hatsudoki Kabushiki Kaisha, Iwata, Japan

[21] Appl. No.: 305,270

[22] Filed: Sep. 24, 1981

[30] Foreign Application Priority Data

Sep. 30, 1980 [JP] Japan .................................. 55-136521

[51] Int. Cl.³ .............................................. F02M 9/06
[52] U.S. Cl. ................................. 261/23 A; 261/44 B; 123/308
[58] Field of Search ........................ 261/23 A, 44 B; 123/308

[56] References Cited

U.S. PATENT DOCUMENTS

| | | | |
|---|---|---|---|
| 2,466,181 | 4/1949 | Myrick | 123/308 |
| 3,109,043 | 10/1963 | Carlson et al. | 261/23 A |
| 3,188,060 | 6/1965 | Kalert, Jr. | 261/23 A |
| 3,245,667 | 4/1966 | Kittler et al. | 261/23 A |
| 3,343,820 | 9/1967 | Elliott | 261/23 A |
| 4,118,445 | 10/1978 | Shishido et al. | 261/44 B |
| 4,270,500 | 6/1981 | Nakagawa et al. | 123/308 |
| 4,308,830 | 1/1982 | Yamada et al. | 123/308 |
| 4,317,438 | 3/1982 | Yagi et al. | 123/308 |

FOREIGN PATENT DOCUMENTS 52-52220  4/1979  Japan .................................. 123/308

*Primary Examiner*—Tim R. Miles
*Attorney, Agent, or Firm*—Ernest A. Beutler

[57] ABSTRACT

An induction system and carburetor for a high performance internal combustion engine wherein a pair of separate intake passages serve each of the engine chambers. The carburetor has separate barrels, one for each intake passage and which have a fuel discharge circuit therefor. The fuel discharge circuits for each of the carburetor barrels is supplied by a common fuel source.

3 Claims, 4 Drawing Figures

CARBURETOR

BACKGROUND OF THE INVENTION

This invention relates to a carburetor and more particularly to an improved carburetion and induction system for an internal combustion engine having a plurality of intake passages serving a common chamber of the engine.

It has been proposed to improve the volumetric efficiency and performance of an engine by providing a plurality of intake valves for each chamber. When a plurality of intake valves are employed, it has been the common practice to Siamese the ports which serve these valves so that a single carburetor barrel will serve the plurality of intake valves. When such an arrangement is employed, however, the shape of the intake passages is such that there is a relatively sharp turn in the individual passages where they depart from their common inlet. Such changes in direction in the air flow of the intake charge will reduce volumetric efficiency. It has been proposed to use two separate intake passages which are supplied by separate barrels of a two-barrel type carburetor. This will have the effect of improving the volumetric efficiency above those of engines having Siamesed intake passages. However, the use of separate carburetor barrels for each of the intake passages gives rise to certain other difficulties. Normally, each barrel has a separate fuel feed circuit which interconnects it with the carburetor fuel bowl. As a result, when the vehicle is making an abrupt maneuver such as under hard cornering, starting, stopping, or when operating on an incline, one of the fuel feed circuits will tend to lean out or starve due to variation of level of the fuel in the bowl. This gives rise to poor running operation. In addition, the use of the separately fed fuel circuits tends to require the use of a larger than normal fuel bowl so as to serve each of the individual barrels and this gives rise to obvious spacial limitations.

It is, therefore, a principle object of this invention to provide an improved, high efficiency induction and carburetion system for an internal combustion engine.

It is a further object of the invention to provide an improved induction system for an internal combustion engine embodying a plurality of intake passages serving a common chamber of the engine.

It is, yet, another object of this invention to provide an improved carburetor for a high output internal combustion engine.

It is, yet, a further object of this invention to provide an improved, compact multiple-barrel carburetor for an internal combustion engine.

SUMMARY OF THE INVENTION

A first feature of this invention is adapted to be embodied in an induction system for an internal combustion engine having two intake passages serving the same chamber and a two-barrel carburetor having each of its barrels communicating with and serving a respective one of the intake passages. Each of the carburetor barrels has a respective fuel discharge circuit. In accordance with the first feature of the invention, the carburetor has a single-fuel bowl serving both of the carburetor barrel fuel discharge circuits.

Still, another feature of the invention is adapted to be embodied in a induction system for an internal combustion engine having two intake passages serving the same chamber and a two-barrel carburetor having each of its barrels communicating with and serving a respective one of the intake passages. Each of the carburetor barrels has a respective fuel discharge circuit. In accordance with this feature of the invention, the fuel discharge circuits of the carburetor barrels have a common inlet for receiving fuel for the respective discharge circuits.

DETAILED DESCRIPTION OF THE PREFERRED EMBODIMENT

Figure 1:
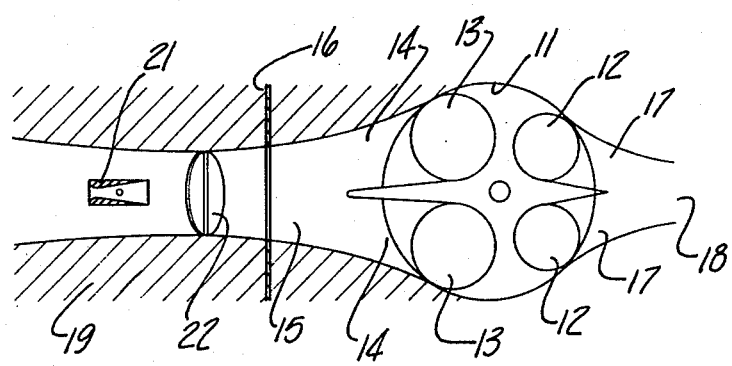
FIG. 1 is a schematic cross-sectional view taken through a prior art construction embodying Siamesed intake passages serving a common chamber of the engine.

FIG. 1 illustrates schematically the prior art type of construction wherein each cylinder 11 of an internal combustion engine is provided with a pair of exhaust valves 12 and a pair of intake valves 13. Individual intake passages 14 serve the intake valves 13 and have a common, Siamesed inlet 15 that extends through the side of the portion of the engine in which the passages 14 are formed, in this instance through the side of a cylinder head 16. In a like manner, the intake valves 12 discharge to individual exhaust passages 17 which have a Siamesed exhaust gas outlet 18.

A carburetor, shown in parts schematically and indicated generally by the referenced numeral 19, is bolted to the cylinder head surface 16 and has a main fuel discharge nozzle 21 formed upstream of a manually operated throttle valve 22. Thus, the carburetor nozzle 21 serves each of the cylinder head intake passages 14. It should be apparent from this figure that the gas flowing through the cylinder head intake 15 must be turned through a fairly substantial angle to enter the individual intake passages 14. This change in flow direction significantly reduces charging efficiency due to the flow restriction encountered by requiring the intake charge to change direction.

Turning now to the illustrated embodiment of the invention, a cylinder head is shown in part schematically and is identified generally by the reference numeral 31. The cylinder head 31 forms, in part, a combustion chamber 32 which cooperates with a cylinder bore and piston (not shown). As with the prior art, a pair of exhaust valves 33 are provided in the cylinder head 31 and exhaust gases from the chamber 32 to individual exhaust passages 34 formed in the cylinder head 31, which exhaust passages merge into a common Siamesed exhaust outlet 35.

Figure 3:
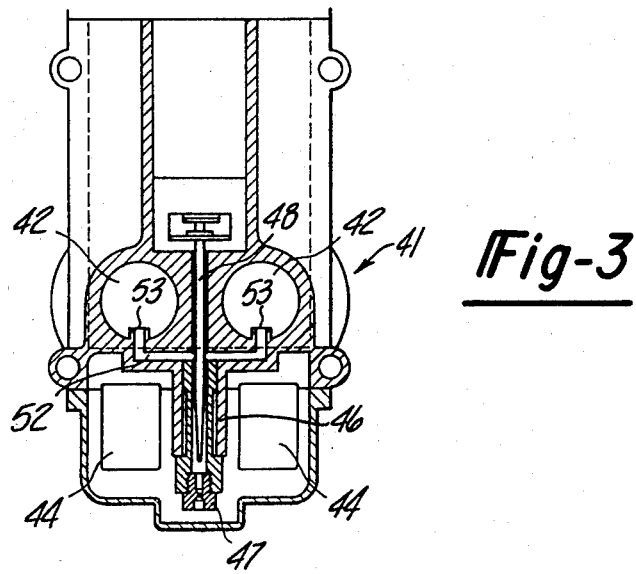
FIG. 3 is an enlarged cross-sectional view taken generally along the line 3—3 of FIG. 2 and shows the carburetor.
Figure 4:
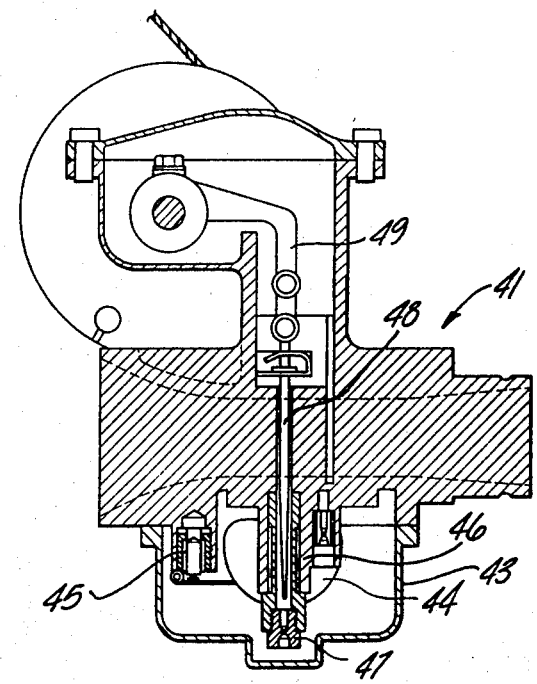
FIG. 4 is a cross-sectional view taken along the line 4—4 of FIG. 3.

The cylinder head 31 is also provided with a pair of intake valves 36 which control the flow through a pair of intake passages 37 formed in the cylinder head and extending through the side opposite the exhaust passages 34. The cylinder head intake passages 37 are aligned with cooperating intake passages 38 of an intake manifold 39 that is affixed to the cylinder head 31 in a known manner. A carburetor, indicated generally by the referenced numeral 41, and shown in most detail in FIGS. 3 and 4 is attached in any known manner to the intake manifold 39. The carburetor 41 has a pair of barrels 42 each of which cooperates with a respective of the intake manifold passages 38. As should be readily apparent from FIG. 2, the intake passages consisting of the carburetor barrels 42, intake manifold passages 38 and cylinder head passages 37, are substantially straight and unrestricted. Hence, a high volumetric efficiency will result.

As will become apparent from a description of FIGS. 3 and 4, the carburetor 41 is constructed so as to be extremely compact in size and, thus, afford greater latitude in engine design without having interference occur between the float bowls of adjacent carburetors. In addition, such compact efficiency permits a weight saving and other attendant advantages.

Figure 2:
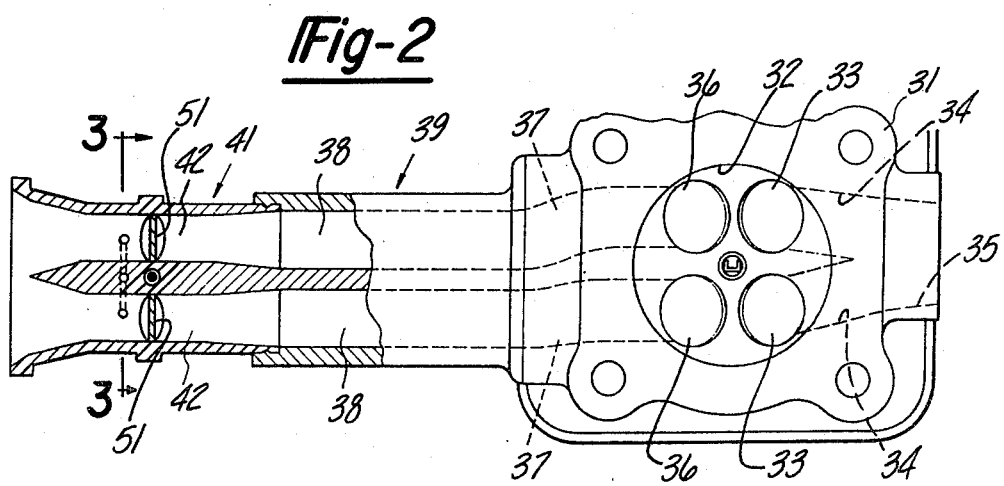
FIG. 2 is view, in part similar to FIG. 1, showing an embodiment of the invention.

In the body of the carburetor 11 there is provided a fuel bowl 43 that underlies the induction passages 42 and which extends only slightly greater in distance than the transverse extent of the main intake passages 42 as clearly shown in FIG. 2. A float 44 and float operated needle valve 45 are provided for maintaining a uniform head of fuel in the fuel bowl 44 in a known manner. The float 44 is of the bifurcated type and spans a main fuel well 46 that extends centrally into the fuel bowl 44 and which has a main metering jet 47 at its lower end. A metering rod 48 is slideably supported in a bore in the carburetor body and depends into the main fuel well 46 for controlling the flow of fuel. The metering rod 48 is connected to an operating lever 49 which in turn is operatively connected with the throttle valves 51 of the carburetor so as to change the position of the metering rod 48 and the amount of fuel flow through the main fuel system in response to the degree of opening of the throttle valves 51. The throttle valves 51 may be of any known type such as butterfly type throttle valves of sliding piston type throttle valves.

The main fuel well intersects a transversely extending main fuel passage 52 that terminates in a pair of main fuel discharge nozzles 53, each of which serves a respective one of the main intake passages 42. Hence, the main fuel jet 47 and metering rod 48 provide a common fuel source for each of the nozzles 53.

It should be readily apparent that the described construction permits an extremely compact arrangement and also permits the use of a single relatively small fuel bowl for supplying the individual carburetor barrels 53. Furthermore, the use of a single, centrally positioned metering jet insures that uniform fuel flow will be delivered through each of the nozzles 53 regardless of sharp maneuvering of the vehicle assocated with the engine, as well as when the vehicle is being operated on an incline. The relatively simple construction also permits a low manufacturing cost for the carburetor 43. Although a preferred embodiment of the invention has been described and illustrated, it is to be understood that various changes and modification may be made without departing from the spirit and scope of the invention, as defined by the appended claims.

I claim:

1. In an induction system for an internal combustion engine having two intake passages serving the same chamber and a two-barrel carburetor having each of its barrels disposed generally horizontally and communicating with and serving a respective one of said intake passages, each of said carburetor barrels having a respective fuel discharge circuit, the improvement comprising said carburetor having a single fuel bowl positioned adjacent and extending beneath both of said barrels, a fuel well depending centrally into said fuel bowl and having a main jet positioned at its lower end, said fuel well serving both of said carburetor barrel fuel discharge circuits.

2. An induction system as set forth in claim 1, further including a bifurcated float positioned in said fuel bowl for controlling the fuel level therein, the float halves being disposed on opposite sides of the main fuel well.

3. An induction system as set forth in claim 2, wherein the fuel discharge circuits terminate in main fuel nozzles in the respective carburetor barrels.

* * * * *